United States Patent [19]

Arns

[11] 3,903,430

[45] Sept. 2, 1975

[54] LOW LOSS CIRCUIT FAIL DETECTOR

[75] Inventor: Harold E. Arns, Chino, Calif.

[73] Assignee: BASF Aktiengesellschaft, Ludwigshafen (Rhine), Germany

[22] Filed: Sept. 12, 1974

[21] Appl. No.: 505,322

[52] U.S. Cl. .................. 307/125; 340/251; 340/256

[51] Int. Cl.² .......................................... H01H 83/00

[58] Field of Search .................. 307/125; 331/117 R; 324/175; 340/251, 252 R, 248 D, 256, 248 R, 253 Q; 318/327

[56] References Cited

UNITED STATES PATENTS 3,624,629 11/1971 Donaldson ...................... 331/117 R 3,790,874 2/1974 Klimo ............................ 340/248 D

*Primary Examiner*—Robert K. Schaefer
*Assistant Examiner*—M. Ginsburg
*Attorney, Agent, or Firm*—Johnston, Keil, Thompson & Shurtleff

[57] ABSTRACT

A circuit to monitor the operation of an external circuit. Using an oscillator, a rectifier, a filter and an amplifier the circuit produces a very low voltage drop in the monitored circuit during normal operation while providing a high speed logic signal to indicate loss of current in the monitored circuit.

4 Claims, 1 Drawing Figure

LOW LOSS CIRCUIT FAIL DETECTOR

BACKGROUND OF THE INVENTION

This invention relates to the monitoring of an external circuit, for example a lamp circuit, to detect a failure. In the application for which this invention was developed, a lamp is used in an optical tachometer which controls a servo motor. The nature of the control circuit is such that should a failure of the lamp go unnoticed, the motor would accelerate and be damaged. Therefore, a circuit to detect such a failure in order to take steps to prevent such damage is required.

Known methods have disadvantages, however. For example, placing a resistor in series with the lamp and monitoring the voltage drop across the resistor limits the application of full operating voltage to the lamp. Another technique, sensing the lamp with an additional photosensor in optical contact with the lamp, has the general limitation of being adaptable only to lamp circuits. A specific limitation in the optical tachometer system was the requirement of extensive mechanical revision to accomodate the additional photosensor.

A circuit failure detector overcoming the disadvantages of the known detectors is required. The circuit in this invention provides such a detector.

OBJECTS AND SUMMARY OF THE INVENTION

It is an object of this invention to provide a circuit to detect the failure of an electrical circuit to operate normally and to provide a logic output indicative of such failure.

Another object of this invention is to provide a circuit which permits the detection of failure of a monitored circuit while consuming a minimal amount of power.

Still another object of this invention is to provide a failure detection circuit with a response time on the order of under one microsecond.

These and other objects will be obvious from the summary, drawings and detailed description which follow.

The low loss circuit fail detector of this invention is made of of a transistor oscillator, a rectifier, a filter and an amplifier switch. The circuit to be monitored is connected in series with a low resistance inductor in the oscillator. With normal operation of the monitored circuit, the gain of the oscillator is less than unity so the oscillator does not oscillate and the amplifier/switch is biased off. A failure of a component in the monitored circuit, the lamp for example, will cause the current through the inductor and the monitored circuit to cease with the result that the oscillator begins to oscillate. The rectified and filtered signal from the oscillator causes the amplifier switch to be biased on. In this manner a logic output is generated providing the desired signal as to whether or not the external circuit is operating properly. This logic output may then be utilized to either indicate the failure or to initiate actions made necessary by the failure.

DRAWING

The FIGURE is a wiring schematic of an embodiment of the circuit fail detector shown in conjuction with a circuit to be monitored.

DETAILED DESCRIPTION

Figure 1:
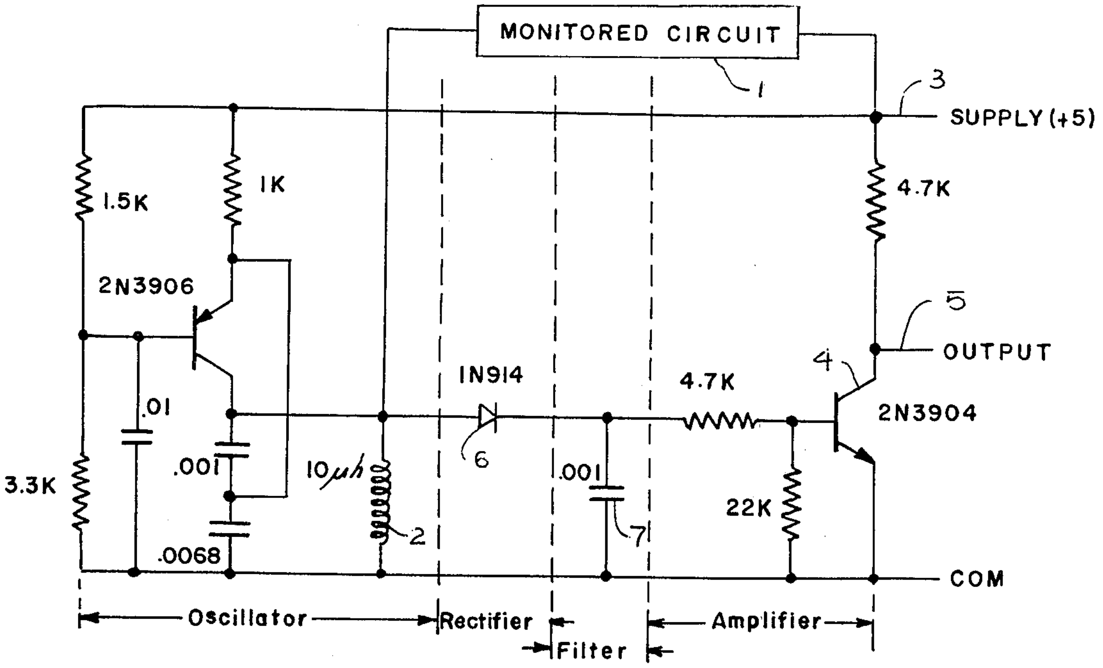

Referring to The FIGURE, which represents the embodiment designed for use with the optical tachometer circuit referred to above, the monitored circuit 1 is shown connected between the low resistance inductor 2 of the oscillator and the supply 3. This arrangement permits a single power supply to operate both the monitored circuit and the monitoring circuit. Should different voltages or polarities be required, however, separate power supplies could be used. As is apparent to one skilled in the art, with monitored circuit 1 operating properly the oscillator will have a gain of less than unity and, therefore, will not oscillate. With no oscillation the output of the oscillator will bias transistor 4 off and result in the output 5 being equal to the supply voltage (+5 volts in this example). Due to the low resistance of the inductor 2 there is little dc voltage drop across it so that nearly the full power supply voltage is supplied across the monitored circuit. The mere placing of a resistor in series with the monitored circuit as suggested above would not permit this result since a significant voltage drop across the resistor would be necessary to enable reliable detection.

Should a current-carrying element in the monitored circuit 1 fail, the oscillator shown would begin to oscillate at about 1.6 MHz with about +3 volts peak amplitude. This ac signal would be rectified by diode 6 and filtered by capacitor 7 to bias transistor 4 on, causing the output 5 to drop to COM+V saturation of the transistor. It is apparent that the time between the failure in the monitored circuit and the switching on of the transistor is a function of the frequency of the ac output of the oscillator. Accordingly, in the circuit shown the response time is less than 0.5 microseconds.

As is well known to those skilled in the art the generation of the low level transistor output upon failure of the monitored circuit may be utilized to indicate the failure by causing the switching on of a suitable indication device, such as a light or alarm buzzer, or to initiate measures to prevent adverse effects from the failure. In the above example of the optical tachometer servo control circuit, the preventative measure is the removal of power to the motor to prevent the acceleration and consequent damage of the motor.

From the above description it can be seen that the circuit in this invention overcomes the disadvantages of known prior art devices. As shown the circuit can use the same power supply as used for the monitored circuit. In addition the monitored circuit can be connected to a voltage source of a higher or lower level or even of the opposite polarity and still be used with the detector circuit of the present invention. Instead of the amplifier, a sensitive gate SCR or triac can be used to provide a latched output or an output to an alternating current device. Also, an extremely fast response time, variable by changing the oscillator frequency, is possible.

These and other variations from the embodiment described in detail may be made without departing from the scope and spirit of the appended claims.

I claim:

1. In combination with an external circuit a circuit for detecting the loss of current through said external circuit, said detection circuit comprising:

an oscillator, said oscillator having an oscillation period determined by its components, said oscillator having an inductor of the low resistance type, said external circuit being connected in series with said low resistance inductor;

rectifying means to rectify the output of said oscillator;

filtering means to filter the output of said rectifying means;

switch means connected to the output of said filtering means, said switch means having a first output when said oscillator is not oscillating and having a second output when said oscillator is oscillating, and means causing normal current flow through said external circuit by way of said low resistance inductor with the result that said oscillator does not oscillate and said switch means has said first output while when current ceases flowing through said inductor and said external circuit, said oscillator oscillates and said switch means has said second output, said switch means being controlled to switch to said second output with a response time which is a function of the period of oscillation of the oscillator.

2. The combination circuit as set forth in claim 1 wherein said period of oscillation is less than one microsecond.

3. In combination with an optical tachometer circuit a circuit for detecting the loss of current through the lamp of said optical tachometer circuit, said detection circuit comprising:

an oscillator, said oscillator having an oscillation period determined by its components, said oscillator having an inductor of the low resistance type, said external circuit being connected in series with said low resistance inductor;

rectifying means to rectify the output of said oscillator;

filtering means to filter the output of said rectifying means;

switch means connected to the output of said filtering means, said switch means having a first output when said oscillator is not oscillating and having a second output when said oscillator is oscillating, and means causing normal current flow through said optical tachometer by way of the low resistance inductor with the result that when the lamp of said optical tachometer fails said oscillator begins oscillating and said switch means has said second output to produce a signal preventing adverse effects resulting from the failure of said lamp.

4. The combination as set forth in claim 3 wherein said period of oscillation is less than one microsecond.

* * * * *